(12) United States Patent
Chen et al.

(10) Patent No.: US 6,431,700 B1
(45) Date of Patent: Aug. 13, 2002

(54) INK JET PRINTING METHOD

(75) Inventors: Huijuan D. Chen, Webster; David Erdtmann, Rochester; Ann L. Carroll-Lee, Rochester; Steven Evans, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/709,078

(22) Filed: Nov. 10, 2000

(51) Int. Cl.[7] .............................................. G01D 11/00
(52) U.S. Cl. ......................... 347/100; 347/106; 347/96
(58) Field of Search ......................... 347/100, 96, 105; 428/195

(56) References Cited

U.S. PATENT DOCUMENTS

| | | | |
|---|---|---|---|
| 4,246,154 A | | 1/1981 | Yao |
| 4,460,637 A | | 7/1984 | Miyamoto et al. |
| 5,354,601 A | * | 10/1994 | Kamijo et al. ............... 428/216 |
| 5,696,182 A | * | 12/1997 | Kashiwazaki et al. ...... 347/100 |
| 5,852,074 A | | 12/1998 | Tsutsumi et al. |
| 5,916,357 A | * | 6/1999 | Wang et al. ............. 106/31.27 |
| 5,985,988 A | | 11/1999 | Hodge |
| 5,997,622 A | | 12/1999 | Weber et ak |

FOREIGN PATENT DOCUMENTS

| | | | | |
|---|---|---|---|---|
| EP | 0 068 903 A1 | | 1/1983 | |
| EP | 0813978 A1 | * | 12/1997 | ............ B41M/5/00 |
| EP | 0934833 A2 | * | 8/1999 | ............ B41M/5/00 |
| EP | 1 048 478 A2 | | 11/2000 | |
| GB | 2 105 735 A | | 3/1983 | |

* cited by examiner

*Primary Examiner*—John Barlow
*Assistant Examiner*—Manish S. Shah
(74) *Attorney, Agent, or Firm*—Harold E. Cole

(57) ABSTRACT

An ink jet printing method, including the steps of:

A) providing an ink jet printer that is responsive to digital data signals;

B) loading the printer with ink-receptive elements including a support having thereon a porous ink-receptive layer;

C) loading the printer with an ink jet ink composition including a water-dispersible polymeric latex having contained therein a water-insoluble, salt-type dye; and D) printing on the ink-receptive layer using the ink jet ink in response to the digital data signals.

16 Claims, No Drawings

INK JET PRINTING METHOD

CROSS REFERENCE TO RELATED APPLICATION

Reference is made to co-pending U.S. application Ser. No. 09/510,879, filed Feb. 23, 2000.

FIELD OF THE INVENTION

This invention relates to an ink jet printing method which employs a porous receiver and an ink jet composition which provides improved light and dark stability.

BACKGROUND OF THE INVENTION

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging. The inks used in ink jet printers are generally classified as either dye-based or pigment-based.

A dye is a colorant which is molecularly dispersed or solvated by a carrier. The carrier can be a liquid or a solid at room temperature. A commonly used carrier is water or a mixture of water and organic co-solvents. Each individual dye molecule is surrounded by molecules of the carrier. In dye-based inks, no particles are observable under the microscope. Although there have been many recent advances in the art of dye-based ink jet inks, such inks still suffer from deficiencies such as low optical densities on plain paper and poor light-fastness. When water is used as the carrier, such inks also generally suffer from poor water fastness.

U.S. Pat. Nos. 4,246,154 and 5,852,074 relate to an ink jet ink composition comprising an water-insoluble dye dispersed in a water-dispersible polymer. However, there is a problem with this ink in that when it is printed onto a conventional receiver, the dry time is slow.

U.S. Pat. No. 4,460,637 relates to a porous ink jet receiver element. However, there is a problem with this element in that when it is printed with a conventional aqueous dye-based ink, the printed image has poor light and dark stability.

In co-pending U.S. application Ser. No. 09/510,879, filed Feb. 23, 2000, mentioned above, ink jet compositions are described which provide excellent lightfastness when printed onto a porous ink jet receiver. However, the maximum density obtained with such prints could be improved.

It is an object of this invention to provide an ink jet printing method which provides an image which has a fast dry time. It is another object of this invention to provide an ink jet printing method which provides an image which has improved light and dark stability.

SUMMARY OF THE INVENTION

These and other objects are achieved in accordance with this invention which relates to an ink jet printing method, comprising the steps of:

A) providing an ink jet printer that is responsive to digital data signals;

B) loading the printer with ink-receptive elements comprising a support having thereon a porous ink-receptive layer;

C) loading the printer with an ink jet ink composition comprising a water-dispersible polymeric latex having contained therein a water-insoluble, salt-type dye; and D) printing on the ink-receptive layer using the ink jet ink in response to the digital data signals.

DETAILED DESCRIPTION OF THE INVENTION

The support for the ink-receptive element employed in the invention can be paper or resin-coated paper, or plastics such as a polyester-type resin such as poly(ethylene terephthalate), polycarbonate resins, polysulfone resins, methacrylic resins, cellophane, acetate plastics, cellulose diacetate, cellulose triacetate, vinyl chloride resins, poly (ethylene naphthalate), polyester diacetate, various glass materials, etc. The thickness of the support employed in the invention can be, for example, from about 12 to about 500 $\mu$m, preferably from about 75 to about 300 $\mu$m.

In a preferred embodiment of the invention, the porous ink-receptive layer contains inorganic particles such as silica, alumina, titanium dioxide, clay, calcium carbonate, barium sulfate, or zinc oxide. In another preferred embodiment, the porous ink-receptive layer comprises from about 20% to about 90% inorganic particles and from about 10% to about 80% polymeric binder, such as gelatin, poly (vinyl alcohol), poly(vinyl pyrrolidinone) or poly(vinyl acetate). The porous ink-receptive layer can also contain polymer micro-porous structures without inorganic filler particles as disclosed in U.S. Pat. Nos. 5,374,475 and 4,954,395.

A broad range of water-insoluble, salt-type dyes having a hydrophobic counterion may be used in the invention. In a preferred embodiment of the invention, the water-insoluble, salt-type dye having a hydrophobic counterion may be a cationic dye or an anionic dye. In another preferred embodiment of the invention, the cationic dye is an azo dye, such as a quaternized pyrazoleazoaniline dye as disclosed in U.S. patent application Ser. No. 09/643,281, filed Aug. 22, 2000, the disclosure of which is hereby incorporated by reference; a triarylmethane dye; an azine dye; a phthalocyanine dye; an oxazine dye or a thiazine dye.

Hydrophobic counterions for a cationic water-insoluble salt-type dye which may be used the invention include tetrafluoroborate, perchlorate, hexafluorophosphate and dodecyl sulfonate.

In another preferred embodiment of the invention, the water-insoluble, salt-type dye having a hydrophobic counterion may be an anionic dye such as a metal-complex dye, such as a transition metal complex of an 8-heterocyclylazo-5-hydroxyquinoline; an azo dye, such as C.I. Direct Yellow 132; a phthalocyanine dye such as C.I. Direct Blue 199; an anthraquinone dye, or an anthrapyridone dye. U.S. patent application Ser. No. 09/387,585, filed Aug. 31, 1999 of Erdtmann et al. discloses examples of the above dyes.

Hydrophobic counterions for an anionic water-insoluble salt-type dye which may be used the invention include quaternary ammonium, phosphonium and alkyl pyridinium.

The water-insoluble, salt-type dyes having a hydrophobic counterion used in the invention are not novel and may be prepared using techniques as described in U.S. Pat. No. 3,945,836 and EP 0534365 A1. The solubility in water of the water-insoluble, salt-type dyes having a hydrophobic counterion used in the invention should be <1% by weight, preferably <0.5% by weight, and more preferably <0.1% by weight.

The dye-containing polymeric latex employed in the invention can be prepared by dissolving the dye in a water-miscible organic solvent, mixing the solution with the latex and then removing the solvent. Useful water-miscible organic solvents are water-miscible alcohols, ketones and amides, tetrahydrofuran, N-methyl-2-pyrrolidone, dimethylsulfoxide and mixtures thereof, such as acetone, ethyl alcohol, methyl alcohol, isopropyl alcohol, dimethylformamide, methyl-ethyl ketone etc.

The ink jet ink containing the water-dispersible polymeric latex employed in the invention consists of water as a continuous phase and dye-containing polymeric latex as a dispersed phase. In a preferred embodiment of the invention, the polymeric latex meets the following test: At 25° C., the polymeric latex must: (a) be capable of forming a stable dispersion with water at a concentration of from 0.2 to 50 percent by weight, preferably 1 to 20 percent by weight, and (b) when 100 ml of the latex is then mixed in an equal volume of the water-miscible organic solvent described above, stirred and allowed to stand for 10 minutes exhibit no observable coagulation of the polymeric latex. In order to be useful in the ink, the latex should have an average particle size of <1 $\mu$m, preferably <0.5 $\mu$m.

Aqueous lattices can be prepared by free radical polymerization or by condensation polymerization. Emulsion polymerization is the preferred method of preparing polymer lattices. Monomers suitable to prepare the polymer lattices for this application include an acrylic acid, for example, acrylic acid, .alpha.-chloroacrylic acid, an .alpha.-alkylacrylic acid (such as methacrylic acid, etc.), etc., an ester or amide derived from an acrylic acid (for example, acrylamide, methacrylamide, n-butylacrylamide, t-butylacrylamide, diacetone acrylamide, methyl acrylate, ethyl acrylate, n-propyl acrylate, n-butyl acrylate, tert-butyl acrylate, isobutyl acrylate, 2-ethylhexyl acrylate, n-octyl acrylate, lauryl acrylate, tetrahydrofuryl acrylate, methyl methacrylate, ethyl methacrylate, n-butyl methacrylate, .beta.-hydroxy methacrylate, tetrahydrofuryl metbacrylate, etc.), a vinyl ester (for example, vinyl acetate, vinyl propionate, vinyl laurate, etc.), acrylonitrile, methacrylonitrile, an aromatic vinyl compound (for example, styrene and a derivative thereof, vinyl toluene, divinyl benzene, vinyl acetophenone, sulfostyrene, etc.), itaconic acid, citraconic acid, crotonic acid, vinylidene chloride, a vinyl alkyl ether (for example, vinyl ethyl ether, etc.), an ester of maleic acid, N-vinyl-2-pyrrolidone, N-vinylpyridine, 2- or 4-vinylpyridine, etc. Of these monomers, an ester of acrylic acid, an ester of methacrylic acid, and styrene and styrene derivatives are particularly preferred. Two or more ethylenic unsaturated monomers can be used together. For example, a combination of methyl acrylate and butyl acrylate, ethyl acrylate and styrene , tetrahydrofuryl methacrylate and ethylacrylate, methyl acrylate and ethyl acrylate, etc., can be used.

The polymeric latex used in the invention can be prepared by emulsion polymerization or solution polymerization technique. Emulsion polymerization is preferred. Emulsion polymerization is well known in the art and is described, for example, in F. A. Bovey, Emulsion Polymerization, issued by Interscience Publishers Inc. New York, 1955. Examples of the chemical initiators which may be used include a thermally decomposable initiator, for example, a persulfate (such as ammonium persulfate, potassium persulfate, sodium persulfate), hydrogen peroxide, 4,4'-azobis(4-cyanovaleric acid), and redox initiators such as hydrogen peroxide-iron(II) salt, potassium persulfate-sodium hydrogen sulfate, potassium persulfate-sodium metabisulfite, potassium persulfate-sodium hydrogen bisulfite, cerium salt-alcohol, etc. Emulsifiers which may be used in the emulsion polymerization include soap, a sulfonate(for example, sodium N-methyl-N-oleoyltaurate, sodium dode-cylbenzene sulfonate alpha-olefin sulfonate, diphenyloxide disulfonate, naphthalene sulfonate, sulfosuccinates and sulfosuccinamates, polyether sulfonate, alkyl polyether sulfonate, alkylarylpolyether sulfonate, etc.), a sulfate (for example, sodium dodecyl sulfate), a phosphate (for example, nonylphenol ethoxylate phosphate, linear alcohol alkoxylate phosphate, alkylphenol ethoxylate phosphate, phenol ethoxylate), a cationic compound (for example, cetyl trimethylammonium bromide, hexadecyl trimethylammonium bromide, etc.), an amphoteric compound and a high molecular weight protective colloid (for example, polyvinyl alcohol, polyacrylic acid, gelatin, etc.).

A second class of polymeric lattices used in the invention may be an aqueous dispersible polyester such as Eastman AQ® polyesters (Eastman Chemical Company). The three polyesters, Eastman AQ 29®, AQ 38®, and AQ 55® are composed of varying amounts of isophthalic acid, sodium sulfoisophthalic acid, diethylene glycol, and 1,4-cyclohexanedimethanol. These thermoplastic, amorphous, ionic polyesters are prepared by a melt-phase condensation polymerization at high temperature and low pressure, and the molten product is extruded into small pellets. The solid polymer disperses readily in water at 70° C. with minimal agitation to give translucent, low viscosity dispersions containing no added surfactants or solvents. Varying the amount of ionic monomers, i.e., sulfoisophthalic acid, can control the particle size. The particle sizes range from 20 to 100 nm.

A third class of polymeric lattices used in the invention may be an aqueous dispersible polyurethane such as Witcobond® anionic and cationic polyurethane dispersion (Witco Corp.) or Sancure® polyurethane (B F Goodrich Company).

A humectant may be added to the composition employed in the process of the invention to help prevent the ink from drying out or crusting in the orifices of the ink jet printhead. Polyhydric alcohols useful in the invention for this purpose include, for example, ethylene glycol, diethylene glycol, triethylene glycol, propylene glycol, tetraethylene glycol, polyethylene glycol, glycerol, 2-methyl-2,4-pentanediol, 1,2,6-hexanetriol and thioglycol. The humectant may be employed in a concentration of from about 10 to about 50% by weight. In a preferred embodiment, diethylene glycol or a mixture of glycerol and diethylene glycol is employed a concentration of between 10 and 20 wt. %.

A co-solvent can also be employed in the composition employed in the process of the invention. The selection of a co-solvent depends on the requirements of the specific application, such as desired surface tension and viscosity, the selected colorant, drying time of the ink jet ink, and the type of paper onto which the ink will be printed. Representative examples of water- soluble co-solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) esters, such as ethyl acetate, ethyl lactate, ethylene carbonate and propylene carbonate; and (4) sulfur-containing compounds such as dimethyl sulfoxide and tetramethylene sulfone.

The ink has physical properties compatible with a wide range of ejecting conditions, i.e., driving voltages and pulse widths for thermal ink jet printing devices, driving frequencies of the piezo element for either a drop-on-demand device or a continuous device, and the shape and size of the nozzle.

A penetrant (0–10 wt. %) may also be added to the ink composition employed in the process of the invention to help the ink penetrate the receiving substrate, especially when the substrate is a highly sized paper. A preferred penetrant for the inks of the present invention is n-propanol at a final concentration of 1–6 wt. %.

A biocide (0.01–1.0 wt. %) may also be added to prevent unwanted microbial growth which may occur in the ink over time. A preferred biocide for the inks employed in the present invention is Proxel® GXL (Zeneca Colours Co.) at a concentration of 0.05–0.5 wt. %. Additional additives which may optionally be present in ink jet inks include thickeners, conductivity enhancing agents, anti-kogation agents, drying agents, and defoamers.

Commercially available ink jet printers use several different methods to control the deposition of the ink droplets. Such methods are generally of two types: continuous stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance with digital data signals. An ink droplet is not generated and ejected through the orifices of the print head unless it is needed.

The following example illustrates the utility of the present invention.

EXAMPLE

The following dyes were used in the Example:

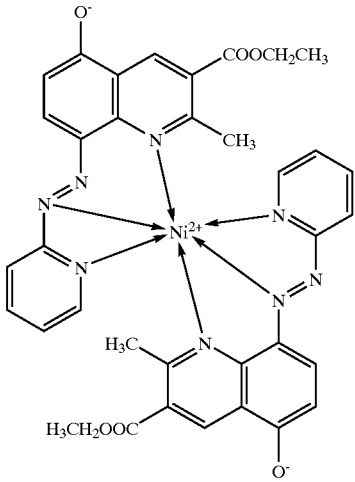

Water insoluble Control Dye-1A

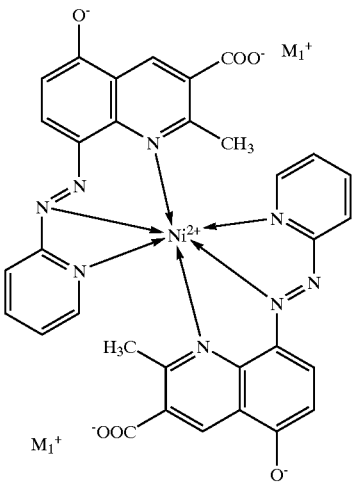

Water Soluble Control Dye-1B: $M_1^+=[NH(CH_2CH_2OH)_3]^+$,
Water Insoluble Dye-1: $M_1^+=[N(CH_2CH_2CH_2CH_3)_4]^+$;

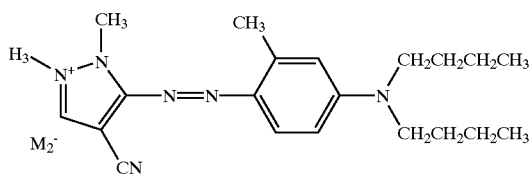

Water soluble Control Dye-2: $M_2^-=CH_3CH(OH)COO^-$
Water insoluble Dye-2: $M_2^-=BF_4^-$ Comparative Element 1A (C-1A)

Comparative ink example 1A was prepared using an AQ55® dispersion that contained water insoluble Control Dye-1A. The AQ55® dispersion was prepared as follows: to 15.6 g of 31.2% commercially available dispersion AQ55® (Eastman Chemical Co.) was added 34.4 g of water and 50.0 g of methanol. The resulting composition was stirred vigorously at room temperature to form the latex solution.

To prepare a dye solution, 0.82 g of Control Dye 1A was dissolved in 50.0 mL of methanol. The dye solution was then added drop-wise to the above AQ55 dispersion with continuous stirring. After 1 hour, the organic solvent was removed under reduced pressure. Some precipitation was observed in the above mixture. The resulting stock solution was filtered through a 0.45 µm filter. The concentration of dye 1 in the latex stock solution was estimated to be 0.3% by weight, and polymer concentration was ~10% by weight.

To prepare the ink solution, 20.0 g of the above latex solution, 0.12 g Surfynol® 465 (Air Products), 7.0 g glycerol, 4.0 g diethylene glycol, 2.40 g diethylene glycol monobutyl ether (Dowanol® DB) were added to 6.48 g distilled water. The final ink contained 0.30% Surfynol® 465, 17.5% glycerol, 10% diethylene glycol and 6% Dowanol® DB. The solution was filtered through a 3 µm polytetrafluoroethylene filter and filled into an Epson SO20089 inkjet cartridge.

A test image consisting of a series of 21 variable density patches, approximately 15 by 13 mm in size, ranging from 5% dot coverage to 100% dot coverage was printed onto commercially available Konica Photo IJ QP Paper with an Epson 800 inkjet printer. The sample was allowed to dry for 24 hours at ambient temperature and humidity.

Comparative Element 1B (C-1B)

This element was prepared similar to Comparative Element 1A except that Control Dye 1B was used instead of AQ55® containing Control Dye 1A. To prepare comparative ink jet ink, 4.40 g of Control Dye 1B was used instead of 20 g of the latex solution containing Control Dye 1A.

Comparative Element 2 (C-2)

This element was prepared similar to Comparative Element 1B except that Control Dye 2 was used instead of Control Dye 1B.

Element 1 of the Invention (I-1)

An element similar to Comparative Element 1A was prepared except that Dye 1 was used instead of Control Dye 1A. No precipitation of dye was observed in the preparation of the AQ55® dispersion containing Dye-1. The concentration of dye 1 in the latex stock solution was estimated to be 1.6% by weight, and polymer concentration was ~10% by weight. To prepare the ink solution, 20.0 g of the above latex solution, 0.12 g Surfynol® 465 (Air Products), 7.0 g glycerol, 4.0 g diethylene glycol, 2.40 g diethylene glycol monobutyl ether (Dowanol® DB) were added to 6.48 g distilled water. The final ink contained 0.30% Surfynol® 465, 17.5% glycerol, 10% diethylene glycol and 6% Dowanol® DB. The solution was filtered through a 3 µm polytetrafluoroethylene filter and filled into an Epson SO20089 inkjet cartridge.

A test image consisting of a series of 21 variable density patches, approximately 15 by 13 mm in size, ranging from 5% dot coverage to 100% dot coverage was printed onto commercially available Konica Photo IJ QP Paper with an Epson 800 inkjet printer. The sample was allowed to dry for 24 hours at ambient temperature and humidity.

Element 2 of the Invention (I-2)

An element similar to Comparative Element 1A was prepared except that Dye 2 was used instead of Control Dye 1A.

Density Tests

The Status A reflection densities were measured using an X-Rite® 414 densitometer for the images printed onto Konica QP Photo Paper. The maximum densities for Comparative Element 1A and Element 1 of the invention are shown in Table 1.

Stability Tests

The above step images printed onto Konica QP Photo Paper were then subjected to low intensity florescent irradiation (1 Klux) for four weeks. Additional samples were subjected to high intensity daylight irradiation (50 Klux) for one week. The Status A reflection densities of maximum density patch of the said step images were measured using an X-Rite® 414 densitometer before and after the fade test. The % retained in Status A density for the 100% dot coverage patches were calculated and listed in Table 2.

Smear Test

The above step images printed onto Konica QP Photo Paper were subjected to 25° C., 80% RH. The Status A reflection densities of maximum density patch of the said step images were measured using an X-Rite 414 ® densitometer before and after the smear test. The % retained in Status A density for the 100% dot coverage patches were calculated and listed in Table 2.

TABLE 1

| Element | Dye | Dmax |
| --- | --- | --- |
| C-1A | Control Dye 1A | 0.3 |
| I-1 | Dye 1 | 1.8 |

The above results in Table 1 show that the element of the invention had improved print density as compared to the control element.

TABLE 2

| | | % Density Retained | | |
| --- | --- | --- | --- | --- |
| Example | Dye | 1 Week 50 Klux Daylight | 4 Week 1 Klux | 1 Week 25° C., 80 % RH |
| C-1B | Control Dye-1B | 8 | 9 | 40 |
| I-1 | Dye-1 | 90 | 101 | 99 |
| C-2 | Control Dye-2 | 30 | 95 | 112 |
| I-2 | Dye-2 | 86 | 100 | 103 |

The above results in Table 2 show that the elements of the invention had improved waterfastness and lightfastness as compared to the control elements.

The invention has been described in detail with particular reference to certain preferred embodiments thereof, but it will be understood that variations and modifications can be effected within the spirit and scope of the invention.

What is claimed is:

1. An ink jet printing method comprising the steps of:

A) providing an ink jet printer that is responsive to digital data signals;

B) loading said printer with ink-receptive elements comprising a support having thereon a porous ink-receptive layer;

C) loading said printer with an ink jet ink composition comprising a water-dispersible polymeric latex having contained therein a water-insoluble, salt-type dye having a hydrophobic counterion, said water-dispersible polymeric latex comprising water as a continuous phase and dye-containing polymeric latex as a dispersed phase;

D) printing on said ink-receptive layer using said ink jet ink in response to said digital data signals.

2. The method of claim 1 wherein said porous ink-receptive layer contains inorganic particles.

3. The method of claim 2 wherein said inorganic particles comprise silica, alumina, titanium dioxide, clay, calcium carbonate, barium sulfate, or zinc oxide.

4. The method of claim 1 wherein said porous ink-receptive layer comprises from about 20% to about 90% inorganic particles and from about 10% to about 80% polymeric binder.

5. The method of claim 4 wherein said polymeric binder is gelatin, poly(vinyl alcohol), poly(vinyl pyrrolidinone) or poly(vinyl acetate).

6. The method of claim 1 wherein said water-dispersible polymeric latex comprises a polyester, a polyurethane or an acrylate.

7. The method of claim 1 wherein said water-insoluble, salt-type dye is a cationic dye.

8. The method of claim 7 wherein said cationic dye is an azo dye, a triarylmethane dye, an azine dye, a phthalocyanine dye, an oxazine dye or a thiazine dye.

9. The method of claim 8 wherein said azo dye is a quaternized pyrazoleazoaniline dye.

10. The method of claim 7 wherein said hydrophobic counterion is tetrafluoroborate, perchlorate, hexafluorophosphate or dodecyl sulfonate.

11. The method of claim 1 wherein said water-insoluble, salt-type dye is an anionic dye.

12. The method of claim 11 wherein said anionic dye is a metal-complex dye, an azo dye, a phthalocyanine dye, an anthraquinone dye, or an anthrapyridone dye.

13. The method of claim 12 wherein said metal-complex dye is a transition metal complex of an 8-heterocyclylazo-5-hydroxyquinoline.

14. The method of claim 12 wherein said azo dye is C.I. Direct Yellow 132.

15. The method of claim 12 wherein said phthalocyanine dye is C.I. Direct Blue 199.

16. The method of claim 11 wherein said hydrophobic counterion is quaternary ammonium, phosphonium or alkyl pyridinium.

* * * * *